247x
3 Sheets—Sheet 1.
B. DEARBORN.
WINDMILL.
Patented Apr. 30, 1799.
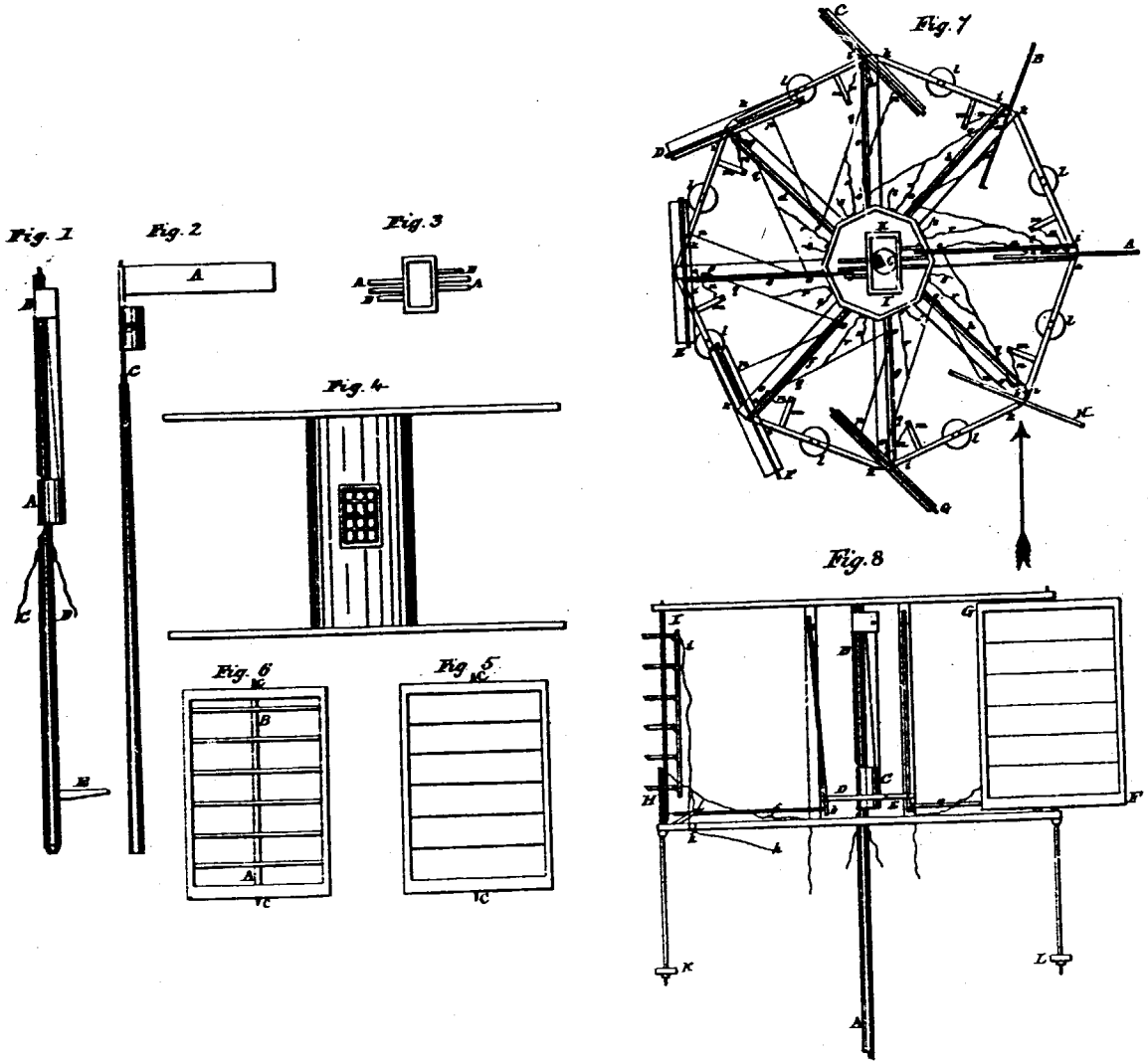

247y
3 Sheets—Sheet 2.
B. DEARBORN.
WINDMILL.
Patented Apr. 30, 1799.
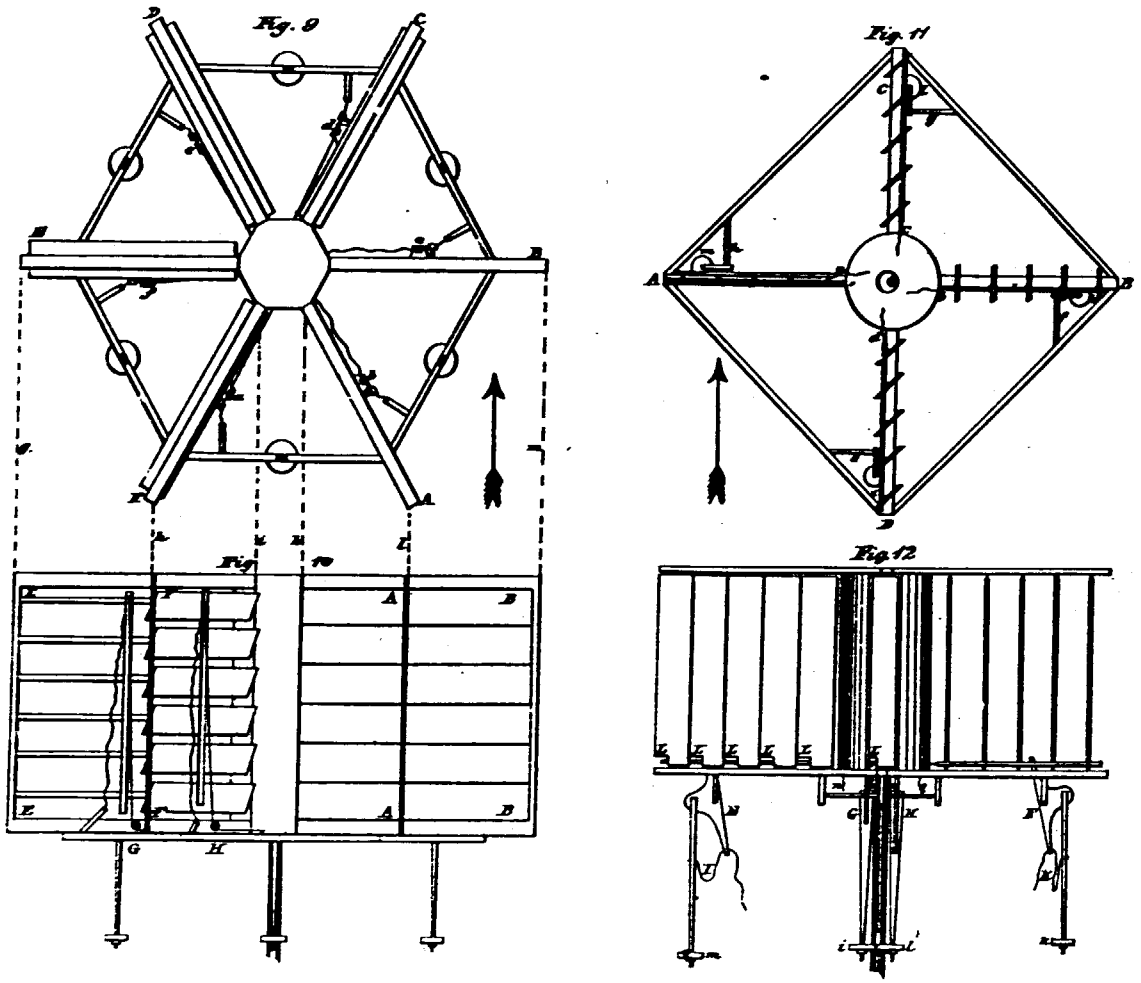

No Printed Specification Available
247X
3 Sheets—Sheet 3.
B. DEARBORN.
WINDMILL.
Patented Apr. 30, 1799.
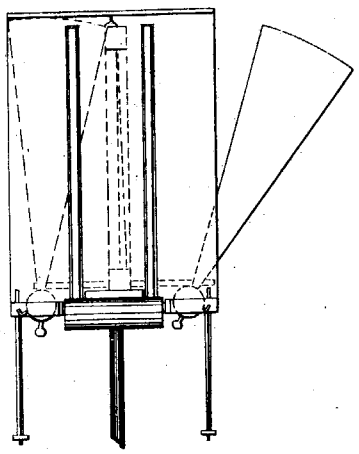
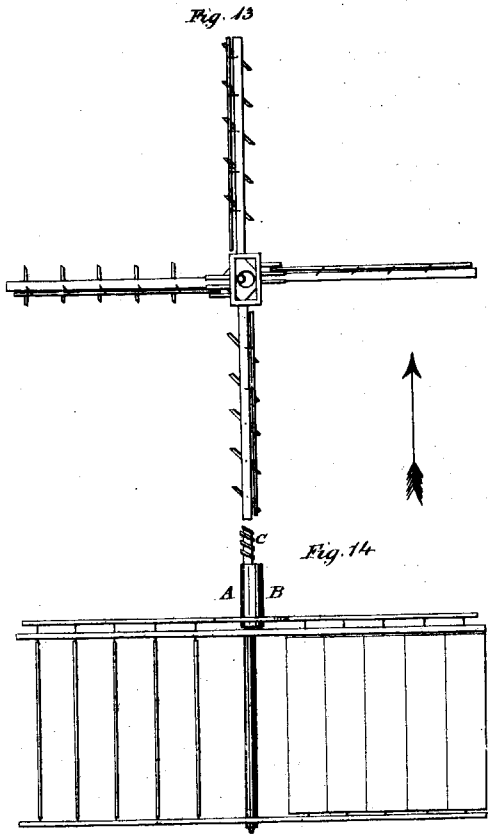
THE NORRIS PETERS CO., PHOTO-LITHO., WASHINGTON, D. C.

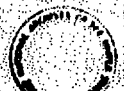

Benjamin Dearborn , Massachusetts 4/30/1799

Letters Patent Dated April 30. 1799.

The Schedule referred to in these Letters Patent and making part of the same contain-ing a description in the words of the said Benjamin Dearborn himself of his improve-ment being a double [illegible] Mill for wind or water with [illegible] regula-tors for adjusting the velocity of the Mill in strong winds The double [illegible] Mill has a horizontal motion round a perpendicular shaft or axis, and round an eccentric circle ~~[illegible]~~ [illegible] or the [illegible] of a [illegible] nearly en-compassing the shaft. The eccentric circle is so constructed as to be drawn over upon one side of the shaft until its periphery [illegible] or nearly coincides with the centre of the shaft while the mill is in motion. When the mill is to be stopped the eccentric circle is drawn back until its centre coincides as nearly as possible with the centre of the shaft. This circle is then [illegible] for common purposes without turning round ~~on~~ the shaft, and to turn it to that side which the wind requires. The shaft is made to turn upon its centre by means of a lever fixed in the lower part so that when the shaft is turned the eccentric circle is turned with it. This lever may be put in on any side of the shaft but that side is the best which requires the lever to be turned directly towards the quarter from which the wind blows. If the shaft should turn so easy as to be moved by the friction of the mill in its circular motion it may be prevented by tapering ~~the~~ lower extremity to the form of the [illegible] of a cone inverted and setting it into a circular cavity fitted to its shape whereby it may rest against the sides of the cavity without touching the bottom or the lever may be made to be fixed by a pin in any part of its revolution or it may fall into notches like the the tiller of some small vessels used in fishing &c. or a wheel with dogs may run round the shaft with a [illegible] or [illegible] head to turn it. The eccentric circle is moved by two cords or [illegible] which pass through the shaft and down on opposite sides of it into the lower part of the mill. This circle may be made to slide on pieces fixed horizontally on the shaft, or it may swing at the end of a bar the other end turning on a hinge or pin as in the model and the circle may be placed at the upper or lower end of the bar but for common purpose

247X it is most convenient at the [illegible]. Upon the construction above described, the
eccentric circle answers all the ends of the invention in a mill for common
purposes erected on land or in a boat; but for special purposes as when a mill
is required to be in motion at all times when the wind blows &c the eccentric
circle must be so constructed as to be turned by a fane or weathercock. This may
be done by affixing the circle to one side of the shaft. and confining the fane to the
shaft in such a manner as that the shaft will be turned by the wind. But a
better method of constructing it is to make the eccentric circle turn. with a some
a [illegible] in the centre of the top of the shaft. and connected with one side of the pe
riphery of the eccentric circle. which side must rise above the shaft and down.
and on the top of this rising part the fane must be so fixed that when turned to
lie leeward or directly from the wind. the eccentric circle may give that posi_
tion to the wings which will give the greatest power to the mill. For a water
Mill in a stream constantly running one course. the eccentric circle must be
moveable on one side of the shaft in the manner first above mentioned but need
not turn If the stream runs both ways as in tide mills the eccentric circle
must be made to turn by hand occasionally or to turn by the tide as in the above
description it turns by the fane. A mill constructed with a fane in the manner
above described will at all times be in a proper position for the wind or water
when their power is sufficient to give it motion. and during the continuance of
the power will be constantly at work without attendants for raising water or
any other purpose to which it may be applied. The eccentric circle above descri
bed may be applied in various ways to the purpose of increasing a power on one
side of a wheel and reducing it on the other. for example the wings of a wind
mill or ladle boards of a water mill may be turned on a horizontal axis, or
they may be thrown out on one side and drawn in on the opposite, or they
may be raised on one side and depressed on the opposite with other varia_
tions by this invention. But in whatever manner the eccentric circle may
be applied to mill-work, the author of this description considers the right of
the invention as vested in him. as it has never heretofore to his knowledge
been applied to mill-works and he verily believes himself to be the origin
al inventor of this power in such application of its uses. and further he
believes that if it is the will of the great Author of motion to indulge his

[illegible] with the [illegible] and [illegible] of that which is denominated perpet-
ual. that the eccentric circle will be the means which shall lead to the long sought
but hitherto unattained desideratum. ✓ The use of the eccentric circle as it
is applied in the model is to give the wings of the mill a circular motion of
ninety degrees. whereby they are turned with their broad surfaces to the
wind on that side of the wheel which receives the power. and with their edges to
the wind on the opposite side of the wheel. thereby making on that side the
least possible resistance while those between take an oblique direction to in-
crease the power of the wheel, all the wings taking in rotation the position
above described. Of the directing frames. Around the eccentric circle
are placed directing frames their number being equal to one half the number
of wings in a wind mill or float boards in a water mill. These frames
are so constructed as to leave in the centre a space in the form of a parallel
square. The breadth of this space is very little more than the diameter of the
eccentric circle. its length is nearly twice its breadth. These frames are
suspended by pendant pieces, two to each frame. in such a manner that
the frames swing from side to side of the dome without touching each other,
their motion being produced by their turning round the eccentric circle is
communicated to the wings or float boards by means of straight pieces which
may be called leaders: these are united at one end to the frame or to the
pendant pieces which support the frames and at the other to the wing
or float board. Each frame has two of these leaders attached to it thereby
giving the proper position to two opposite wings or float boards in all parts
of their revolution and in magnitude. The wings or floats may be more numer-
ous each directing frame turning. four six eight or more wings or floats.
The directing frames are prevented from deriving a circular motion by a notched
slot in the opposite extremities which slide on a pin or post fixed on the dome.
Of the Connected Arms. The dome is made of any required length with just
sufficient breadth for the directing frames and their motions. It may be built
square or in the form of a cylinder, the shaft passing through its centre.
From one end of this dome are extended any number of arms which may
be found convenient or useful, in the model they are eight. From the
other end of the dome are equal number of arms are extended parallel to the 24 the other and in the same direction. These arms may be of any required length
each pair containing one or more wings or float Boards. or the wings may
[illegible] be circular or multiangular frames affixed to the arms. Under the bottom
of the Dome a cog wheel is to be fixed for giving motion to the machinery of
the mill below when the work is to be done which the mill is designed to
perform. Of the wings. The wings of a double centred mill designed
for the wind consist of a frame in the form of a square or parallelogram,
enclosing a number of leaves sufficient to fill or nearly fill the frame;
the frame with its leaves somewhat resembling a venetian blind. Each
leaf turns on two pivots resting on the sides of the frame, forming an
axis. This axis is a little above the centre of the gravity in the leaves.
the lower part of the leaves being a little heavier than the upper. The edges
of the leaves are made sloping, the bottom of each leaf shutting against
the top of the next below in such a manner as that when all are shut
they form on that side which is designed to face the wind forms one plane
surface. The leaves are shut by their own weight. and opened by lines
communicating with the centrifugal regulators hereafter described. and also
by lines communicating with the [illegible]. they are also opened by the wind
or by any power applied on the back of them. Each leaf has a pin on the
back by which it is opened. in the model these pieces are [illegible] and be-
ing all arranged in a line communicate with a perpendicular piece
of wood which opens all the leaves together when drawn downward.
Instead of making the leaves of a mill in magnitude [illegible] from side to side of the frame
as in the model. it may be best to have the frame of the wings made
with a perpendicular piece in its centre and the leaves of each wing in
two sets one on each side of the centre piece. These two sets of leaves may
be opened by one piece communicating with both or with two pieces as the
constructor chooses. or a perpendicular piece may be put in or near the
centre of the frame and the leaves still be made as long as the breadth
of the frame. The leaves above described may be made solid of thin
boards with ledges to prevent their warping. or with frames covered
with cloth or any other light durable material. or even with thin sheet
iron or other metals. ✓ The float Boards of a water mill may be

[illegible] with wood or metal leaves as above described. or may be made without
[illegible] leaves if the resistance produced thereby be not too great. The resistance
being in a great measure destroyed by the opening of the leaves when power
is applied on the back of them — Of the Centrifugal Regulator.
The centrifugal regulator are weights suspended from the mill. Each being
hinged at or near the end of a moveable bar hung on a pivot in such
a manner as to swing freely from the centre in the manner of a pendulum.
They are thrown outward from the centre by the centrifugal force produced
by the rotatory motion of the mill. this power increasing according to the
velocity of the mill. A communication is made from the regulator to
the pieces which open the leaves by a cord wire chain or other means which
shall answer the purpose designed. When the centrifugal force throws out
the regulators to a certain degree they open the leaves and the wind passes
through them. The degree of velocity at which the leaves shall thus open,
is determined by the length of the cord or chain which opens them. and
this is lengthened or shortened by the workmen at the mill as he shall
find occasion. and when once properly adjusted will rarely require al-
tering. The number of regulators may be equal to the number of wings.
or one regulator may be made to open two or more wings. The regulator
may also be made by an application of the centrifugal force in various ways,
as by means of balls confined in long cavities, or by fluids &c in tubes.
but weights are most simple and most easily applied. This power may
also be applied to either side of the wing, but it is most convenient on
the back. The author of this description knows of no instance in which
the centrifugal force has heretofore been applied to any purposes except
the amusement of the curious. in philosophical experiments. If in its
application to the wings of a windmill it should be found by future
experience in magnitude to answer the purpose here described &
examined. as far as a miniature model is decisive it must undoubted-
ly be considered a discovery important to the arts. for if a mill
receiving its power from the irregular winds of our atmosphere can
be self regulated by the centrifugal power so as to preserve a tolerable
equality in its motions during all seasons. when the wind is sufficient 247 then the unremitted exertion of the inventor have produced an effect emin-
ently beneficial to mankind. It is but just therefore if the afore-
said power has never before been applied to mill work, that the inven-
tor who first appropriates this hitherto useless power to so important a
purpose. should be secured in an exclusive right to the benefits arising
from the application of that power in all the various manners in which
it may be applied to the purpose of regulating the motion of wind mills,
whether they be erected on land. for giving motion to the [illegible] there or on the wa-
ter in Boats &c. for the purposes of moving those Boats, of loading and
discharging merchandize, and numerous other useful purposes, to which
such mills may be applied if those in magnitude shall be found to
possess the properties of the miniature model in which case this mill
will be capable of being applied to any kind of work. in which a mill
can be successfully used. Some parts of the above described mill
are designed for convenience only. and not being necessary to its mo-
tion may be omitted if the constructor chuses. for example, the dome
is designed only to secure the internal machinery from storms & may
be omitted entirely. or may be added at any time subsequent to the build-
ing of the mill. The cords which communicate with the leaders and open
the leaves may be omitted. as they are only designed to reduce the resist-
ance of the back wings. The wings may be made solid without leaves.
the wheel turning on a horizontal axis. and this may be the form when
this invention is applied to the construction of smoke jacks - to which the
principles are equally applicable as to any other purpose. The eccentric
circle may be immoveably fixed to the shaft. The centrifugal regula-
tors become unnecessary and must be omitted when the power is uniform
as a current of water or. the draught or current of air in a chim-
ney &c. The double centred mill is therefore subject to many variations
in construction suitable to the various purposes to which it may be
applied. the original principles still remaining the same.
The drawings accompanying this description are not laid down by any scale
of measurement. because the forms sizes and proportions of the whole
and its parts may be indefinitely varied. In all [illegible]

of this mill whether for water, steam, or the air or smoke of a chimney. The arms may be fixed into the shaft and the shaft may be made with the barrel, the crankline made outside of the arms and the shaft turning in the pivots with a cylinder or other necessary fastenings to the shaft for doing the required work.

Ord.
1856

3000 words (Drawing cannot be made as there are no dimensions.)